(12) United States Patent
Kubo et al.

(10) Patent No.: US 7,214,417 B2
(45) Date of Patent: May 8, 2007

(54) WEATHER STRIP AND MANUFACTURING METHOD THEREFOR

(75) Inventors: Yoshihisa Kubo, Aichi (JP); Masahiko Ito, Aichi (JP); Mitsunobu Teramoto, Aichi (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 108 days.

(21) Appl. No.: 10/808,590

(22) Filed: Mar. 25, 2004

(65) Prior Publication Data

US 2004/0247827 A1 Dec. 9, 2004

(30) Foreign Application Priority Data

Mar. 28, 2003 (JP) .............................. P2003-089782

(51) Int. Cl.
*E06B 7/16* (2006.01)

(52) U.S. Cl. .................... 428/136; 428/34.1; 49/475.1; 49/479.1

(58) Field of Classification Search ............... 428/34.1, 428/131, 136, 141; 49/475.1, 479.1
See application file for complete search history.

(56) References Cited

U.S. PATENT DOCUMENTS 5,711,907 A   1/1998 Nozaki et al.
5,918,421 A   7/1999 Nozaki
6,395,355 B1 * 5/2002 Nakajima et al. .......... 428/34.1

FOREIGN PATENT DOCUMENTS

| JP | A-S62-19454   | 2/1987 |
| JP | UM-A-62-038746 | 3/1987 |
| JP | A-H02-03952   | 1/1990 |
| JP | UM-A-03-08923 | 1/1991 |
| JP | A-H03-43050   | 4/1991 |
| JP | A-H06-305372  | 11/1994 |

* cited by examiner

*Primary Examiner*—Alicia Chevalier
(74) *Attorney, Agent, or Firm*—Posz Law Group, PLC (57) ABSTRACT

When a molded portion of a weather strip is molded, a slit, from which a core body is taken out, is formed in a mounting base portion thereof. Also, plural blocking pieces are provided at predetermined intervals along the slit. Each of the blocking pieces has a base piece portion formed in such a way as to extend from a mounting-face side of the mounting base portion, and also has an insertion portion, which is integrally formed with the base piece portion, and a lock portion to be locked on an inner surface of the mounting base portion. After the core body is taken out of a molded portion precursor, the base piece portion of each of the blocking pieces is bent around a part thereof continuously connected to the mounting base portion, so that the insertion portion is fitted into the slit, and that the lock portion is locked on the inner surface of the molded portion precursor, which faces a hollow portion. Thus, the molded portion is obtained.

6 Claims, 6 Drawing Sheets

WEATHER STRIP AND MANUFACTURING METHOD THEREFOR

This application is based on Japanese Patent Application No. 2003-089782, which is incorporated herein by reference.

BACKGROUND OF THE INVENTION

1. Field of the Invention

The present invention relates to a weather strip having a molded portion and to a manufacturing method therefor.

2. Description of the Related Art

Hitherto, a weather strip is attached to an opening portion or along a door peripheral edge of a vehicle, such as an automobile. When this kind of a weather strip is manufactured, an extrusion portion is formed like an elongated one by a publicly known extrusion molding method. Then, in a state in which an end part of the extrusion portion is set in a mold apparatus for molding a molded portion, the molded portion is continuously and connectedly molded to an end surface of the extrusion portion.

The mold apparatus used for connectedly molding the molded portion comprises a stationary mold, plural movable molds and a core mold. The core mold comprises a core body for forming a hollow portion, and also comprises an extending plate extending from the core body. When the molded portion is molded, first, an end portion of the extrusion portion having already been molded by a publicly known extrusion molding method is set in the core body by being fitted thereinto. Thus the extrusion portion is attached to the mold apparatus. Subsequently, each of the molds is disposed at a predetermined place and clamped. At this moment, a cavity for molding a molded portion is formed by using each of the molds. Then, unvulcanized rubber is injected and filled into the cavity through a gate (not shown). Subsequently, unvulcanized rubber is vulcanized. Then, each of the molds is opened. A product obtained by integrating the core mold with the vulcanized rubber (or molded portion precursor) is taken out therefrom. At that time, a slit is formed in the molded precursor owing to the presence of the extending plate.

Thus, the molded portion precursor having a hollow portion is obtained by taking the core body from the slit. Thereafter, opposite opening faces of the slit are bonded by adhesive at plural places. Thus, the molded portion is obtained. That is, a weather strip, in which this molded portion is integral with the extrusion portion, is obtained.

However, hitherto, anticipated design has been performed so that the molded portion precursor is molded to be wider than the extrusion portion by width of the slit so as to bond the opening faces of the slit. An operation of bonding the opening faces indispensably needs a step of compressing and holding the molded portion precursor in the direction of width thereof for a predetermined time in a state in which the adhesive is applied thereon. This results in a fear of increase in the number of working manhours, increase in production cost, and reduction in productivity. Additionally, when the opening faces of the slit are bonded directly to each other, width of a mounting base portion is liable to be uneven. Consequently, there has been a fear of drawbacks, such as reduction in sealability of the molded portion.

In recent years, there has appeared a weather strip having a blocking piece, instead of bonding the opening faces directly to each other, so as to counteract the drawbacks (see, for example, JP-A-6-305372).

However, the weather strip described in JP-A-6-305372 is configured so that the blocking piece is simply turned and assembled to the mounting base portion. Thus, this weather strip indispensably needs a step of bonding the blocking piece with adhesive to the mounting base portion. Also, it is difficult to hold bonded parts until the adhesive dries. Consequently, there has been a fear that the bonded parts may be detached from each other by a restoring force of the blocking piece, and that the slit may be opened.

SUMMARY OF THE INVENTION

An object of the invention is to provide a weather strip having a molded portion, which can suppress increase in the number of working manhours, increase in cost, and reduction in productivity when manufactured, and to provide a manufacturing method therefor.

According to an aspect of the invention, there is provided a weather strip (hereunder referred to as a first aspect of the invention) comprising an extrusion portion, and a molded portion connected to the extrusion portion, a mounting base portion attachable to an opening portion or a door circumferential edge of a vehicle, and a seal portion that is integrally formed with the mounting base portion and has a hollow portion. A slit for taking out a core mold is formed in the mounting base portion of the molded portion when performing molding. This weather strip comprises at least one blocking piece, provided in a zone in which the slit is formed. The blocking piece comprises a base piece portion formed in such a manner as to extend from a mounting face of the mounting base portion, an insertion portion, formed integrally with the base piece portion and fitted into the slit by bending the base piece portion around a part thereof continuously connected to the mounting base portion, and a lock portion to be locked on an inner surface of the mounting base portion, which faces the hollow portion, when the insertion portion is fitted thereinto.

According to the first aspect, a predetermined zone of the slit is blocked by fitting a part of the blocking pieces, which are provided outside of the molded portion, into the slit, and that a state, in which the lock portion is locked on the inner surface of the mounting base portion, is maintained by the restoring forces of the bent blocking pieces. Thus, the predetermined zone of the slit can be blocked without bonding the opening faces of the slit directly to each other by adhesive and without bonding the blocking pieces to the mounting base portion. Also, occurrence of drawbacks, such as detachment of the bonded blocking pieces, can be suppressed. Consequently, the invention can omit the step of performing anticipated design so that the molded portion precursor is molded to be wider than the extrusion portion by width of the slit, similarly to the related art, and the step of compressing and holding the molded portion precursor in the direction of width thereof for a predetermined time in a state, in which the adhesive is applied thereon, similarly to the related art. Thus, the invention can suppress increase in the number of working manhours, increase in production cost, and reduction in productivity. Also, the invention can suppress occurrence of the drawback that the direct bonding of the opening faces of the slit results in uneven width of the mounting base portion and in degradation in the increase in the number of working manhours, increase in the production cost, and reduction in productivity sealability of the molded portion. Moreover, the invention can secure the engaged state of the lock portion and the mounting base portion without setting the thickness of the base portion (that is, the part continuously connected to the mounting base portion) to be relatively thin similarly to the blocking pieces of the related weather strip. Consequently, the invention can prevent occurrence of a drawback due to the provision of a thin portion in each of the blocking pieces, for example, breakage of the thin portion. Incidentally, the number of the blocking pieces and the width in the longitudinal direction of the slit appropriately changes corresponding to the shape of the molded portion according to design. For example, in a case where the curvature of the molded portion, such a substantially linear molded portion, is small, it is considered that one blocking piece is provided corresponding to the entire zone, in which the slit is formed. Conversely, in a case where the curvature of the molded portion is large, it is considered that plural blocking pieces, whose width corresponding to the longitudinal direction of the slit is relatively narrow, are provided therein.

In an embodiment (hereunder referred to as a second aspect of the invention) of the first aspect of the invention, the lock portion is locked by an inner surface of the mounting base portion, opposite to a side, on which the base piece portion is formed, across the slit.

According to the second aspect of the invention, the predetermined zone of the slit can be more surely blocked. Also, stresses based on the restoring forces of the blocking pieces are efficiently applied to the lock portion. This increases a locking force thereof. Consequently, a more stable engaged state of the lock portion and the mounting base portion can be secured.

In an embodiment (hereunder referred to as a third aspect of the invention) of the first aspect of the invention, the lock portion comprises a first lock part, locked by an inner surface of the mounting base portion, opposite to a side, on which the base piece portion is formed, across the slit, and a second lock part locked by an inner surface of the mounting base portion at the side, on which the base piece portion is formed.

The third aspect of the invention obtains advantages similar to those of the second aspect of the invention. Also, the blocking piece is locked on both the mounting base portions provided across the slit. Thus, the blocking piece is more difficult to slip off.

According to an embodiment (hereunder referred to as a fourth aspect of the invention) of the second or third aspect of the invention, a sandwich-holding projection portion for sandwich-holding, when the insertion portion is fitted into the slit, a part of the mounting base portion, opposite to a side, on which the base piece portion is formed, in conjunction with the lock portion is provided at the base piece portion.

According to the fourth aspect of the invention, the blocking piece becomes difficult to slip off. A more stable engaged state of the blocking piece and the mounting base portion can be secured.

In an embodiment (hereunder referred to as a fifth aspect of the invention) of one of the first to fourth aspects of the invention, a tapered surface is formed on a part extending from a substantially tip end part of the insertion portion to the lock portion.

The fifth aspect of the invention facilitates the insertion of the insertion portion and the lock portion into the slit. Consequently, workability can be enhanced.

In an embodiment (hereunder referred to as a sixth aspect of the invention) of one of the first to fifth aspects of the invention, the thickness of the insertion portion is set to be substantially equal to the width of the slit.

The sixth aspect of the invention has the following advantages. That is, the insertion portion is fitted into the slit, so that the engaged state of the blocking piece and the mounting base portion can be stabilized still more, that the width of the mounting base portion can be more reliably maintained at a predetermined width, and that degradation in the sealability of the molded portion can be suppressed.

According to an embodiment (hereunder referred to as a seventh aspect of the invention) of one of the first to sixth aspects of the invention, when the insertion portion is fitted into the slit, a surface of the base piece portion is connected with the mounting face of the mounting base portion substantially over the whole area, so that the base piece portion constitutes a part of the mounting base portion.

The seventh aspect of the invention can prevent degradation in mountability at the time of attaching the weather strip to an opening portion of a vehicle or a circumferential edge of a door thereof.

According to another aspect of the invention, there is provided a method (hereunder referred to as an eighth aspect of the invention) for manufacturing a weather strip having a mounting base portion attachable to an opening portion or a door circumferential edge of a vehicle, and also having a seal portion that is integrally formed with the mounting base portion and has a hollow portion. This method comprises a step of molding extrusion portion, a step of forming a cavity, used for forming a molded portion, by a mold apparatus having at least a stationary mold, a movable mold, and a core mold equipped with a core body for forming the hollow portion, and of setting an extending plate, which extends from the core body, to extend from the cavity outwardly, a step of fixing the extrusion portion to the mold apparatus so that an end face of the extrusion portion faces the cavity, a step of injecting and filling rubber material, which is in a plasticized state, in the cavity, a step of separating, upon completion of solidification of the rubber material, the movable mold from the stationary mold, and of removing a molded portion precursor, which is molded by the solidification, together with the core mold, and a step of taking out the core body from a slit, from which at least the extending plate projects, in the molded portion precursor. This method further comprises a step of integrally forming, when the molded portion precursor is molded, at least one blocking piece, which corresponds to a zone set in the slit, with the molded portion precursor, and a step of obtaining the molded portion by bending, after the step of taking out the core body, the blocking piece around a base portion thereof thereby to fit a part of the blocking piece into the slit and to lock an end portion of the blocking piece by an inner surface of the molded portion precursor, which faces the hollow portion.

The eighth aspect of the invention can obtain advantages similar to those of the first aspect of the invention.

In an embodiment (hereunder referred to as a ninth aspect of the invention) of the eighth aspect of the invention, when the step of obtaining the molded portion is performed, a step of bonding a predetermined part of the blocking piece to the molded portion precursor is performed.

According to the ninth aspect of the invention, occurrence of the drawback of slip-off of the blocking piece can be more reliably prevented. A more stable engaged state of the blocking piece and the mounting base portion is secured. Incidentally, when the step of bonding is performed, the blocking piece can be maintained by a restoring force of the blocking piece at the predetermined place, at which the blocking piece is positioned. Thus, the ninth aspect of the invention can omit the step of holding the blocking piece in a state, in which adhesive is applied to the precursor, at the predetermined position for a predetermined time.

In an embodiment (hereunder referred to as a tenth aspect of the invention) of the eighth or ninth aspect of the invention, a plurality of the blocking pieces are formed. Each of the blocking pieces is formed along a direction, in which the movable mold for forming the blocking piece is separated from the stationary mold, in such a way as to extend from the molded portion precursor.

According to the tenth aspect of the invention, when the movable mold is separated from the stationary mold, the blocking piece can relatively easily be taken out of the movable mold. Consequently, the possibility of occurrence of breakage of the blocking piece can be reduced and workability can be enhanced.

In an embodiment (hereunder referred to as an eleventh aspect of the invention) of one of the eighth to tenth aspects of the invention, at least a side portion of the blocking piece is tapered in a direction, in which the movable mold for molding the blocking piece is separated from the stationary mold.

The eleventh aspect has advantages similar to those of the tenth aspect.

DETAILED DESCRIPTION OF PREFERRED EMBODIMENTS

Figure 1:
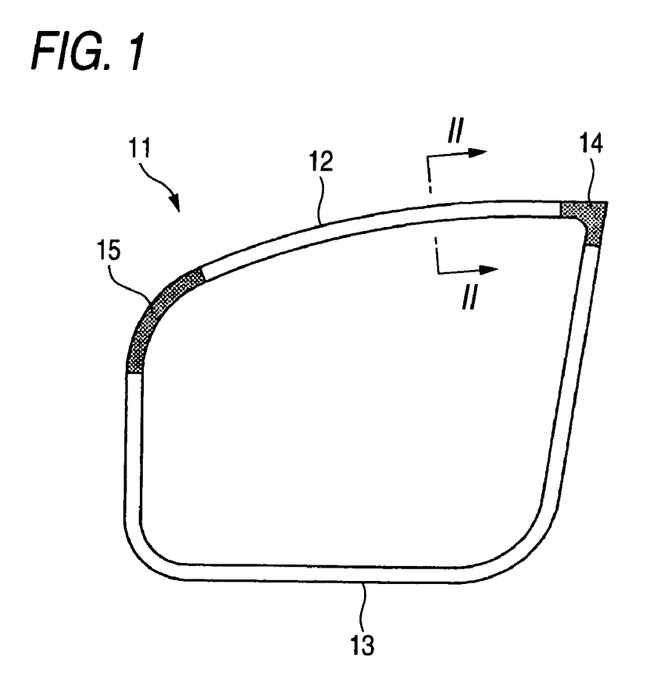
FIG. 1 is a schematic view illustrating an outline configuration of a weather strip that is an embodiment of the invention.

Hereinafter, an embodiment of the invention is described with reference to the accompanying drawings. FIG. 1 shows a door weather strip (hereunder referred to simply as a "weather strip") 11 made of EPTM (ethylene-propylene-diene copolymer) is attached along an outer circumference of an automotive door.

The weather strip 11 has extrusion portions 12, 13 and molded portions (indicated by scattered-dot patterns in this figure) 14, 15. That is, the extrusion portions 12, 13 are almost linearly (or elongatedly) formed by an extruder (not shown). The molded portions 14, 15 are formed by a predetermined mold apparatus in such a way as to connect end edges of the adjacent extrusion portions 12, 13.

Figure 2:
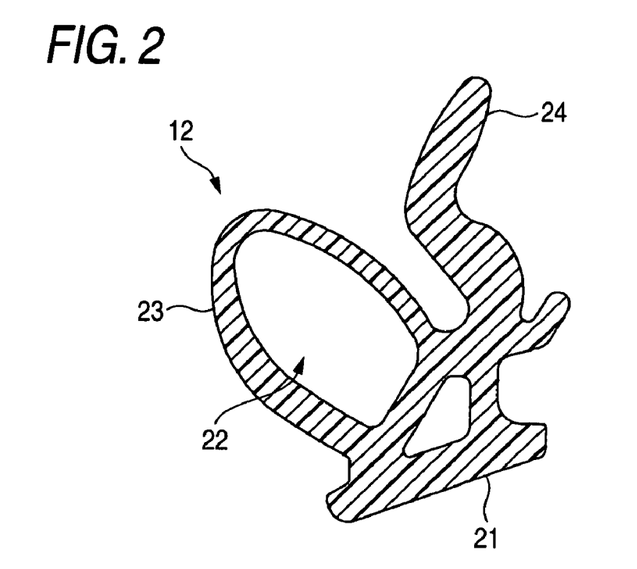
FIG. 2 is a sectional view, taken on line II—II in FIG. 1, illustrating an extrusion portion.
Figure 3:
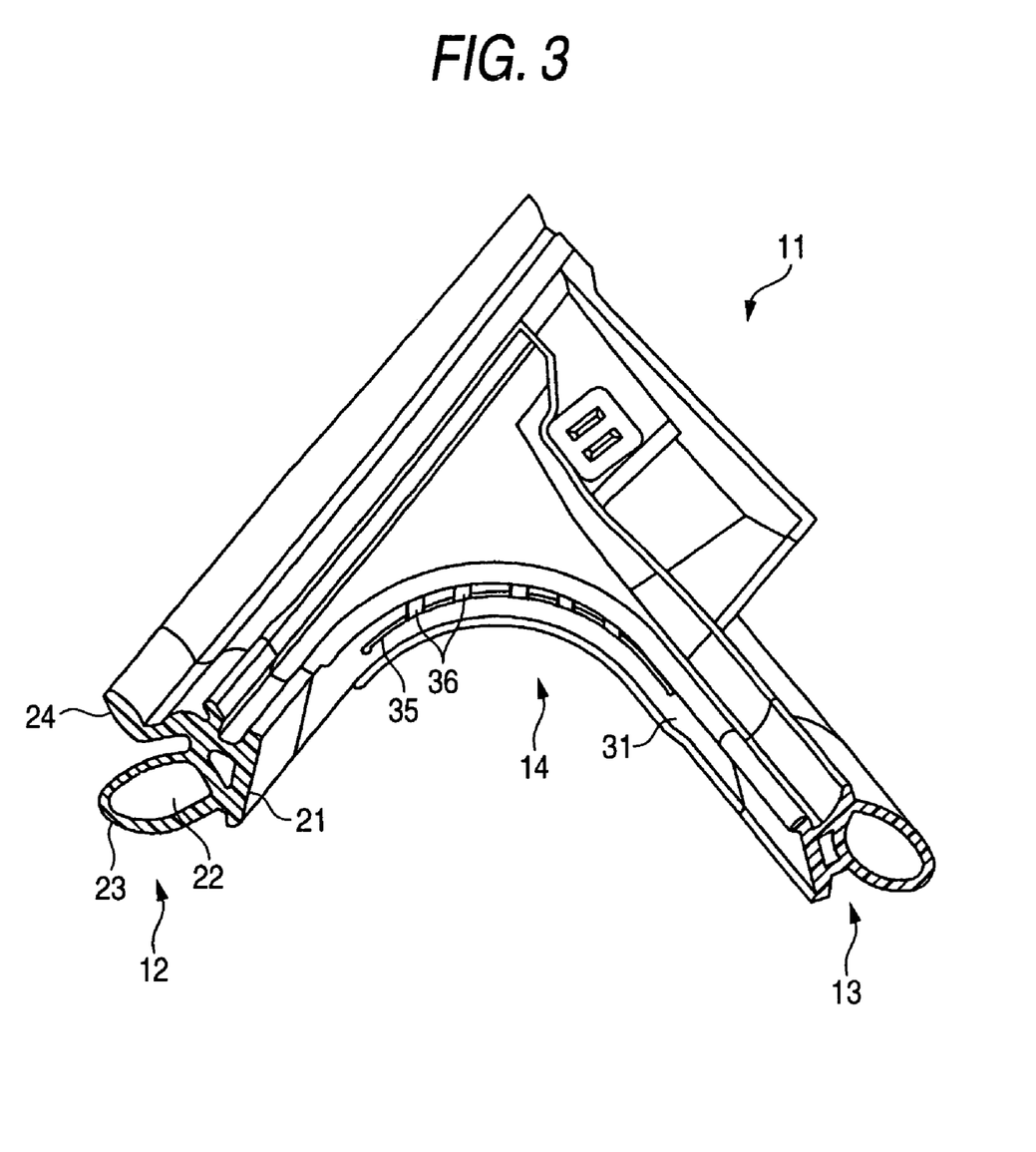
FIG. 3 is a view illustrating a molded portion that corresponds to an upper corner portion.

FIG. 2 shows each of the extrusion portions 12, 13 has a mounting base portion 21 attached to a door sash (not shown) of an automobile door, and also has a seal portion 23, which extends from the mounting base portion 21 and has a hollow portion 34 formed therein, and a lip portion 24 extending from a base end portion of the seal portion 23.

FIGS. 3 to 7B show the molded portion 14 corresponding to the upper corner portion has a mounting base portion 31, a seal portion 32, a lip portion 33, and a hollow portion 34, similarly to the extrusion portions 12, 13, though the molded portion 14 differs in shape from each of the extrusion portions 12, 13. Although not shown, another molded portion 15 has constituent elements similar to those of the molded portion 14, which are described hereinbelow, though the molded portions 14 and 15 differ in shape from each other.

Figure 4:
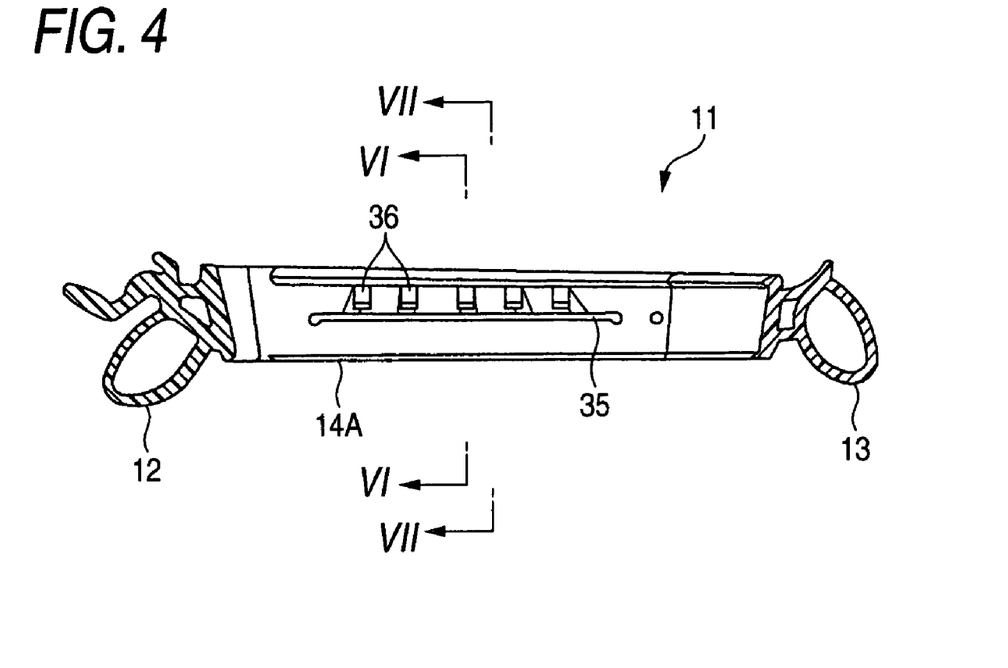
FIG. 4 is a view, taken from the side of a mounting face of the weather strip, illustrating a molded portion precursor.
Figure 7A:
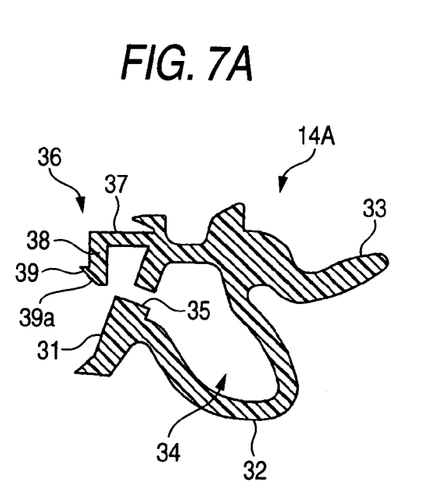
FIG. 7A is a sectional view, taken on line VII—VII in FIG. 4, illustrating the molded portion precursor.

A slit 35 is formed in the mounting base portion 31 of the molded portion 14 along the longitudinal direction thereof by takeout of the mold, as will be described later. Also, plural blocking pieces 36 are provided at predetermined intervals in the molded portion 14 along the longitudinal direction thereof (that is, the longitudinal direction of the slit 35). Incidentally, FIGS. 4 and 7A show a molded portion precursor 14A (to be described later) provided before completion of the molded portion 14 so that the slit 35 is blocked by fitting a part of the blocking pieces 36.

The blocking piece 36 comprises a base piece portion 37 formed in such a manner as to extend from a mounting face of the mounting base portion 31, an insertion portion 38, which is formed integrally with the base piece portion 37 and fitted into the slit 35 by bending the base piece portion 37 around a part thereof continuously connected to the mounting base portion 31, and a lock portion 39 to be locked on an inner surface of the mounting base portion 31, which faces the hollow portion 34, when the insertion portion 38 is fitted thereinto. Incidentally, this embodiment is configured so that the lock portion 39 is locked on the inner surface of the mounting base portion 31, which is provided opposite to the base piece portion 37 across the slit 35. Also, a tapered face 39a is formed on a part, which extends from an almost tip end part of the insertion portion 38 to the lock portion, so as to facilitate insertion of the insertion portion 38 and the lock portion 39 into the slit 35. The thickness of the insertion portion 38 is set to be approximately equal to the width of the slit 35 so as to insert the insertion portion 38 into the slit 35. Moreover, when the insertion portion 38 is fitted into the slit 35, a surface of the base piece portion 37 is connected with the mounting face of the mounting base portion 31 substantially over the whole area, so that the base piece portion 37 constitutes a part of the mounting base portion 31.

Figure 5:
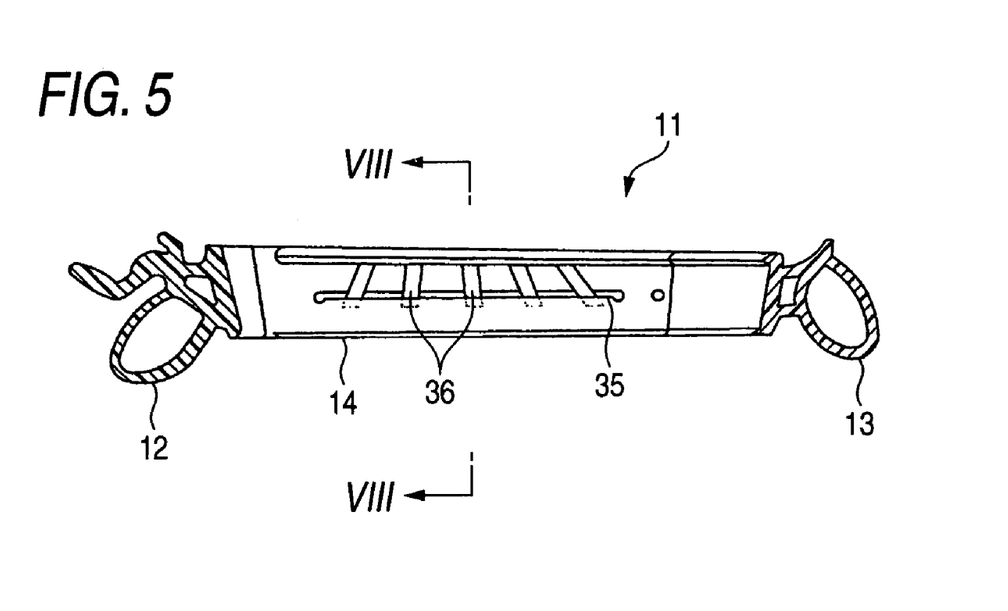
FIG. 5 is a view, taken from the side of the mounting face of the weather strip, illustrating a molded portion.
Figure 6:
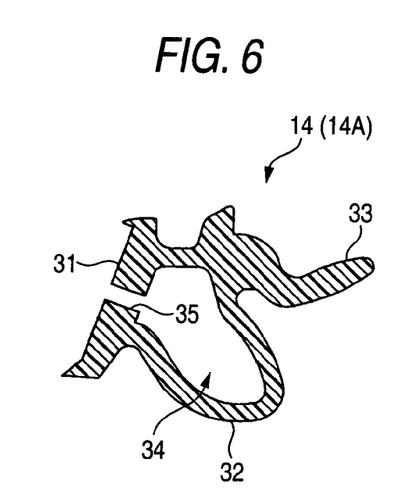
FIG. 6 is a sectional view, taken on line VI—VI in FIG. 4, illustrating the molded portion (or the molded portion precursor)

The blocking pieces 36 are formed in such a way as to be arranged along a direction, in which movable molds (to be described later), such as a movable mold 46, for molding the blocking pieces 36 are separated from the stationary mold, and as to be extended from a body portion of the molded portion precursor 14A. Thus, upon completion of the molded portion 14, the blocking pieces 36 engage with the slit 35 in such a way as to extend along a direction intersecting with the longitudinal direction of the slit 35, as shown in FIG. 5.

Figure 8:
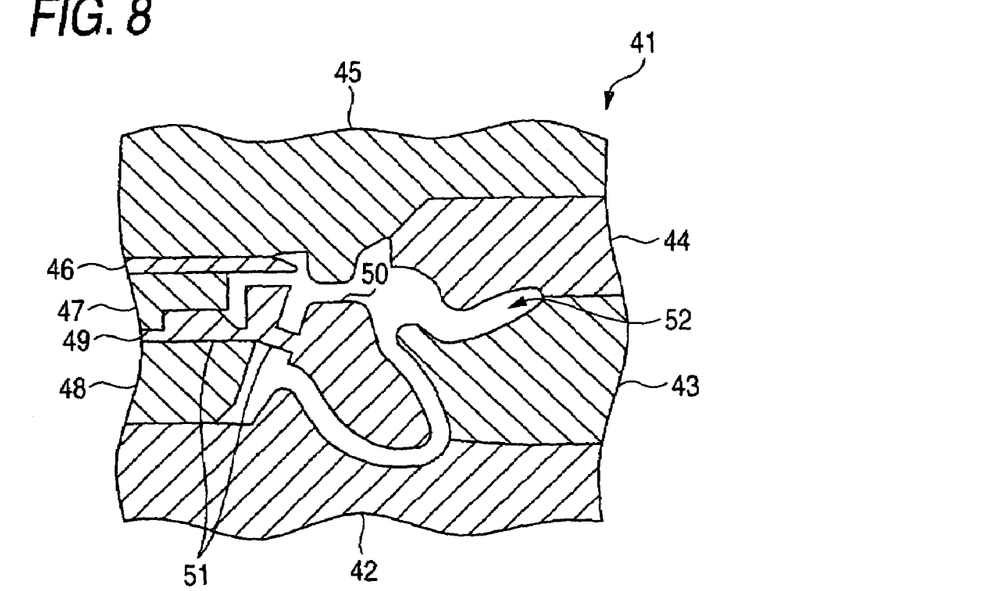
FIG. 8 is a sectional view illustrating a mold apparatus for molding the molded portion.

Next, a mold apparatus 41 for molding the molded portion 14, which corresponds to the upper corner portion, of the weather strip 11 is described hereinbelow. FIG. 8 is a sectional view illustrating the mold apparatus 41 used for molding the molded portion 14. The mold apparatus 41 has, for example, a stationary mold 42 shown in a lower part of this figure, and plural movable molds (a first movable mold 43, a second movable mold 44, a third movable mold 45, a fourth mold 46, a fifth mold 47, and a sixth mold 48). A core mold 49 is provided between the fifth movable mold 47 and the sixth movable mold 48. The first to sixth movable molds 43 to 48 are provided in such a way as to be enabled by a cylinder or the like (not shown) to perform relative movement with respect to the stationary mold 42. The core mold 49 comprises a core body 50 and an extending plate 51 integrally extends from the core body 50.

A molding face corresponding to the outer shape of the molded portion 14 is formed on each of the stationary mold 42 and the movable molds 43 to 48. The core body 50 is used for forming the hollow portion 34, and placed at the center of a space surrounded by the stationary mold 42 and the movable molds 43 to 48. A cavity 52 for molding the molded portion 14 is formed by these molding faces and the outer surface of the core body 50. Incidentally, a part for molding the blocking pieces 36 is included at a predetermined place in the cavity 52. Particularly, a molding face corresponding to the outer shapes of the blocking pieces 36 is formed by the movable molds 46 and 47 and the extending plate 51.

Next, a manufacturing method for the weather strip 11 having the aforementioned configuration, and operations of and advantages in manufacturing the weather strip 11 are described hereinbelow. First, the extrusion portions 12 and 13 are molded according to a publicly known extrusion molding method by using an extruder (not shown). As a result of this molding, the mounting base portion 21, the seal portion 23, a hollow portion 22, and the lip portion 24 of each of the extrusion portions 12 and 13 are formed.

Subsequently, the molded portion 14 is molded as follows. That is, first, in a state in which the molds 42 to 48 are mold-opened to one another, end parts of the extrusion portions 12 and 13 are set by being fitted to both end portions in the longitudinal direction of the core body 50 of the core mold 49. The movable molds 43 to 48 and the core mold 49 are set at predetermined places on the stationary mold 42 and then mold-clamped. Thus, the extrusion potions 12 and 13 are attached and fixed to the mold apparatus 41. Also, as shown in FIG. 8, the cavity 52 is formed.

Figure 9:
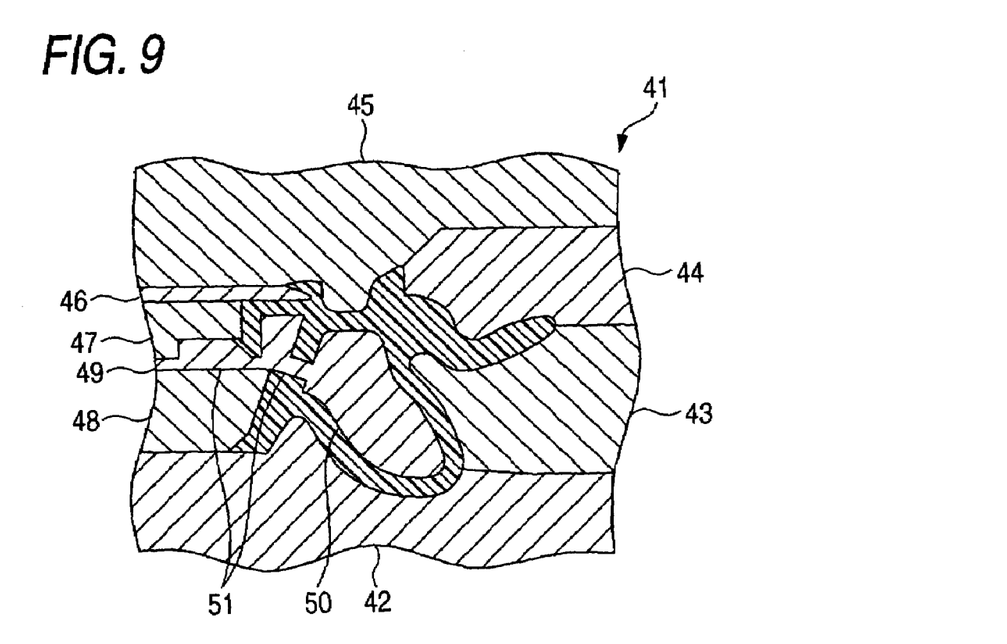
FIG. 9 is a sectional view illustrating the mold apparatus in a state in which a rubber material is filled in a cavity.

During this state, plasticized EPDM is injected from a gate (not shown) into and filled in the cavity 52, as shown in FIG. 9. Subsequently, the EPDM is vulcanized and solidified. Upon completion of solidification thereof, the movable molds 43 to 48 are serially mold-opened. Then, the molded rubber member (hereunder referred to as a "molded portion precursor") 14A is taken out of the mold apparatus 41 together with the core mold 49.

Subsequently, in a state in which the molded portion precursor 14A is separately supported, the extending plate 51 is grasped and then drawn in such a way as to be leftwardly pulled out, as viewed in this figure. At that time, the core body 50 is taken out of the molded portion precursor 14A through the slit 35 formed therein. Then, this takeout of the core body 50 results in that the inside of the molded portion precursor 14A is in a hollow state (see FIG. 7A).

Figure 7B:
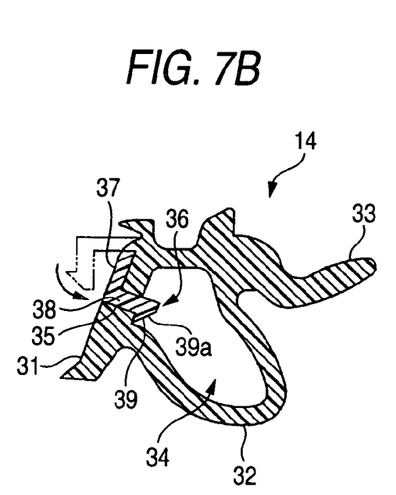
FIG. 7B is a sectional view, taken on line VIII—VIII in FIG. 5, illustrating the molded portion.

Subsequently, as shown in FIG. 7B, the insertion portion 38 is fitted into the slit 35 by bending the base piece portion 37 of the blocking piece 36 around a part thereof continuously connected to the mounting base portion 31. Also, the lock portion 39 is locked on the inner surface of the molded portion precursor 14A, which faces the hollow portion 34.

Thus, the molded portion 14 is finally obtained. Incidentally, although description is omitted, the other molded portion 15 is similarly formed by using a predetermined mold apparatus. Further, the molded portions 14 and 15 differ from each other in the number of the blocking pieces provided therein, and in the width thereof corresponding to the longitudinal direction of the slit, because of the difference in shape therebetween. Thus, the weather strip 11 having the extrusion portions 12 and 13 and also having the formed portions 14 and 15 respectively and continuously molded to the extrusion portions 12 and 13 is obtained.

As described above, this embodiment is configured so that a predetermined zone of the slit 35 is blocked by fitting a part of the blocking pieces 36, which are provided outside of the molded portion 14, into the slit 35, and that a state, in which the lock portion 39 is locked on the inner surface of the mounting base portion 31, is maintained by the restoring forces of the bent blocking pieces 36. Thus, the predetermined zone of the slit 35 can be blocked without bonding the opening faces of the slit 35 directly to each other by adhesive and without bonding the blocking pieces 36 to the mounting base portion 31. Also, occurrence of drawbacks, such as detachment of the bonded blocking pieces 36, can be suppressed. Consequently, the invention can omit the step of performing anticipated design so that the molded portion precursor is molded to be wider than the extrusion portion by width of the slit, similarly to the related art, and the step of compressing and holding the molded portion precursor in the direction of width thereof for a predetermined time in a state, in which the adhesive is applied thereon, similarly to the related art. Thus, the invention can suppress increase in the number of working manhours, increase in production cost, and reduction in productivity. Also, the invention can suppress occurrence of the drawback that the direct bonding of the opening faces of the slit 35 results in uneven width of the mounting base portion 31 and in degradation in the increase in the number of working manhours, increase in the production cost, and reduction in productivity sealability of the molded portion 14.

The lock portion 39 is configured in such a manner as to be locked on the inner surface of the mounting base portion 31, which is provided opposite to the base piece portion 37 across the slit 35. Therefore, the predetermined zone of the slit 35 can be more surely blocked. Also, stresses based on the restoring forces of the blocking pieces 36 are efficiently applied to the lock portion 39. This increases a locking force thereof. Consequently, a more stable engaged state of the lock portion 39 and the mounting base portion 31 can be secured.

With the aforementioned configuration, the invention can secure the engaged state of the lock portion 39 and the mounting base portion 31 without setting the thickness of the base portion to be relatively thin similarly to the blocking pieces of the related weather strip. Consequently, the invention can prevent occurrence of a drawback due to the provision of a thin portion in each of the blocking pieces, for example, breakage of the thin portion.

A weather strip, which can be attached to a sash door, similarly to this embodiment, usually deforms almost linearly when the door is closed. Thus, relatively wide blocking pieces 36 can be provided therein. Consequently, the aforementioned various advantages can be more surely obtained.

Incidentally, the invention is not limited to the described embodiment. For example, the invention may be practiced in the following manner. Needless to say, other applications and alterations, which are not exemplified in the following description, may be made.

(a) Although the aforementioned embodiment is adapted so that the blocking pieces 36 are simply fitted into the slit 35 and that the blocking pieces 36 are not bonded to the mounting base portion 31, adhesive may be applied to at least a part of abutting faces of the blocking piece 36 and the mounting base portion 31 to thereby bond both the blocking piece 36 and the mounting base portion 31 so as to more reliably prevent slip-off of the blocking piece 36. Incidentally, in this case, there is no need for holding the blocking piece 36 until the adhesive dries. Thus, the productivity can be enhanced.

Figure 10A:
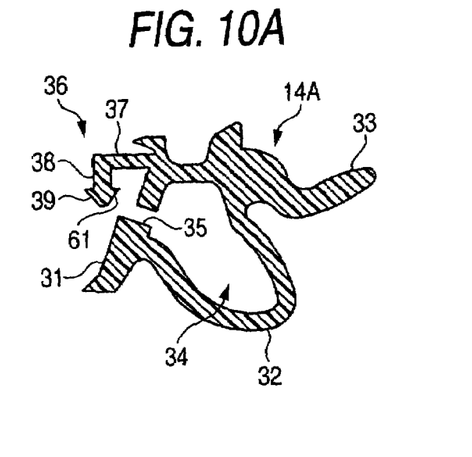
FIG. 10A is a sectional view illustrating a molded portion precursor of another embodiment.
Figure 10B:
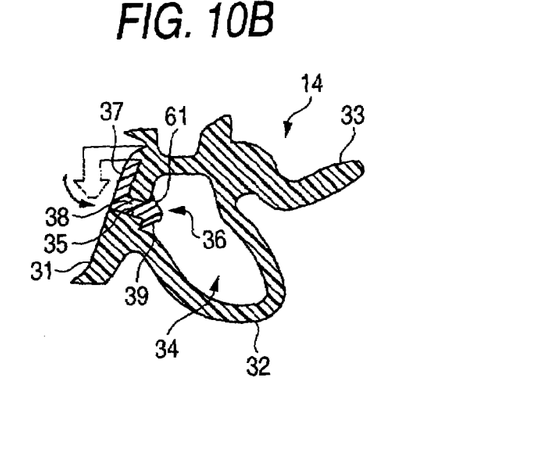
FIG. 10B is a sectional view illustrating a molded portion thereof.

(b) Although only the lock portion 39 locked on the inner surface of the mounting base portion 31, which is formed opposite to the base piece portion 37 across the slit 35, is provided in the aforementioned embodiment, the invention is not limited to such a weather strip. A weather strip of the invention may be configured in such a way as to have a lock portion 61 serving as a second lock portion to be locked on an inner surface of the mounting base portion 31, which is formed on the same side as the base piece portion 37 is formed on, is provided, in addition to the lock portion 39 serving as a first lock portion, as shown in FIGS. 10A and 10B. Incidentally, in this modification, each constituent element, which is the same as that of the aforementioned embodiment, is designated by the same reference character. The description of such a constituent element is omitted herein. With such a configuration, each of the blocking pieces 36 is locked by the mounting base portions 31 respectively placed on both sides across the slit 35. Consequently, the blocking pieces 36 become more difficult to slip off.

Figure 11A:
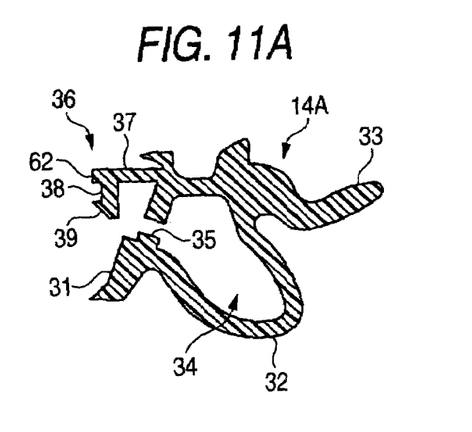
FIG. 11A is a sectional view illustrating a molded portion precursor of another embodiment.
Figure 11B:
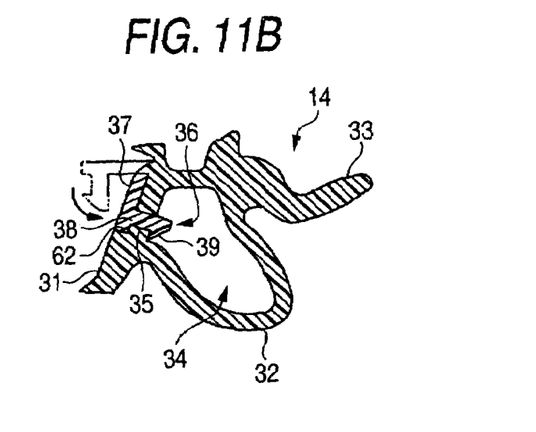
FIG. 11B is a sectional view illustrating a molded portion thereof.

Alternatively, the weather strip may be configured so that the base piece portion 37 has a sandwich-holding projection 62 for locking and holding, when the insertion portion 38 is fitted into the slit 35, a part of the mounting base portion 31 opposite to a side, at which the base piece portion 37 is formed, in conjunction with the lock portion 39, as shown in FIGS. 11A and 11B. With such a configuration, the blocking pieces 26 become more difficult to slip off. A more stable engaged state of the blocking pieces 36 and the mounting base portion 31.

Figure 12A:
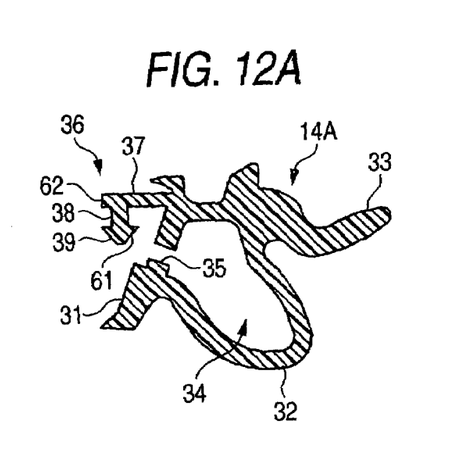
FIG. 12A is a sectional view illustrating a molded portion precursor of another embodiment.
Figure 12B:
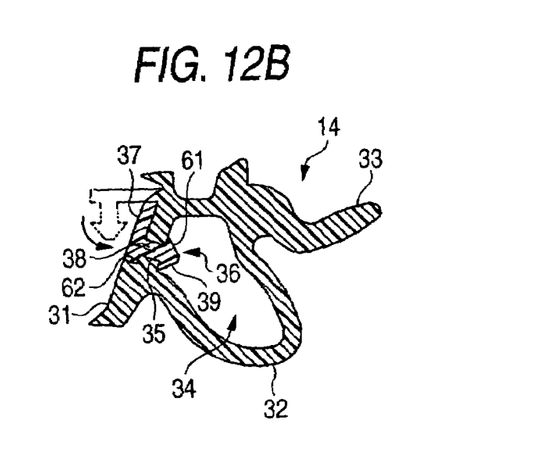
FIG. 12B is a sectional view illustrating a molded portion thereof.

Alternatively, the weather strip may be configured in such a manner as to have the blocking pieces 36 each of which has all the lock portion 39, the lock portion 61, and the sandwich-holding projection 62, as shown in FIGS. 12A and 12B.

(c) In the aforementioned embodiment, the blocking pieces 36 are formed along a direction, in which the movable molds, such as the movable mold 46, for molding the blocking pieces 36 are separated, in such a way as to extend from the body of the molded portion precursor 14A. Instead or in addition, at least a side portion of each of the blocking pieces 36 may be tapered in a direction, in which the movable molds for molding the blocking pieces 36 are separated from the stationary mold.

(d) Although the invention is embodied as the aforementioned embodiment by being applied to the molded portion corresponding to each of the corner portions in the aforementioned embodiment, the feature of the invention is not limited to the molded portions corresponding to the corner portions. The invention can be applied to, for instance, approximately linear molded portions to be molded by being connected to terminals of extrusion portions.

(e) In the aforementioned embodiment, the invention is embodied as a weather strip attached to a sash door. However, an embodiment of the invention is not limited thereto. The invention can be applied to a weather strip attached to a press door. Needless to say, the invention can be applied to a weather strip attached to an opening portion of a door.

(f) Although EPDM is employed as a material of the weather strip 11 in the aforementioned embodiment, the weather strip may be made of one of various other kinds of rubber, such as styrene-butadiene rubber, butadiene rubber, chloroprene rubber, butyl rubber, nitrile rubber, ethylene-propylene copolymerized rubber and acrylic rubber, or a synthetic resin material having rubber-like elasticity (in this case, it is assumed that such a synthetic resin material belongs to the category of a rubber material).

What is claimed is:

1. A weather strip having an extrusion portion, and a molded portion connected to the extrusion portion, the weather strip comprising:

a mounting base portion attachable to one of a door peripheral portion and an opening portion of a vehicle;

a seal portion that is integrally formed with the mounting base portion and has a hollow portion;

a slit for taking out a core mold when performing molding, wherein the slit is formed in the mounting base portion of the molded portion; and at least one blocking piece, which is integrally formed with the mounting base portion at a side of the base portion that is opposite to the seal portion, wherein the blocking piece is located in a zone in which the slit is formed, and wherein the blocking piece comprises:

a base piece portion formed in such a manner as to extend from an attachable mounting surface of the mounting base portion of the molded portion;

an insertion portion integrally formed in such a manner as to extend substantially perpendicularly from the base piece portion, wherein the insertion portion is constructed to be inserted into the slit by bending the base piece portion around a part thereof, wherein a thickness of the insertion portion is set to be substantially equal to width of the slit; and a lock portion that is integrally formed with the insertion portion to be engaged with and locked on an inner surface of the mounting base portion within the hollow portion of the seal portion, when the blocking piece is bent and the insertion portion is inserted into the slit.

2. A weather strip according to claim 1, wherein:

the blocking piece is formed to be substantially Z-shaped, and an outer surface of the lock portion is locked with an inner surface of the mounting base portion, which is in the hollow portion next to the slit.

3. A weather strip according to claim 1, wherein the blocking piece is substantially Y-shaped, and wherein the lock portion comprises:

a first lock part, locked by an inner surface of the mounting base portion, next to the slit, on which the base piece portion is connected to the mounting base portion; and a second lock part locked by an outer surface of the mounting base portion at the side of the mounting base portion on which the base piece portion is connected to the mounting base portion.

4. A weather strip according to claim 3, wherein a sandwich-holding projection portion for sandwich-holding, when the insertion portion is inserted into the slit, a part of the mounting base portion, opposite to a side on which the base piece portion is formed, in conjunction with the lock portion is provided at the base piece portion.

5. A weather strip according to claim 1, wherein a tapered surface is formed on a part extending from a substantially tip end part of the insertion portion to the lock portion.

6. A weather strip according to claim 1, wherein when the insertion portion is inserted into the slit, a surface of the base piece portion is connected with the mounting face of the mounting base portion substantially over the whole area, so that the base piece portion constitutes a part of the mounting base portion.

\* \* \* \* \*